United States Patent [19]

Hessert et al.

[11] 4,146,486

[45] Mar. 27, 1979

[54] COMPOSITION FOR ACIDIZING SUBTERRANEAN FORMATIONS

[75] Inventors: James E. Hessert; Brent J. Bertus, both of Bartlesville, Okla.

[73] Assignee: Phillips Petroleum Company, Bartlesville, Okla.

[21] Appl. No.: 846,063

[22] Filed: Oct. 27, 1977

Related U.S. Application Data

[62] Division of Ser. No. 643,986, Dec. 24, 1975, Pat. No. 4,068,714.

[51] Int. Cl.$^2$ ............................................. E21B 43/27
[52] U.S. Cl. ............................... 252/8.55 C; 166/307; 252/8.55 R; 252/316
[58] Field of Search ...................... 252/8.55 R, 8.55 C, 252/316; 166/307, 308, 282, 283

[56] References Cited

U.S. PATENT DOCUMENTS

| | | | |
|---|---|---|---|
| 3,236,305 | 2/1966 | Parks | 252/8.55 X |
| 3,252,904 | 5/1966 | Carpenter | 252/8.55 |
| 3,727,688 | 4/1973 | Clampitt | 166/283 |
| 3,757,863 | 9/1973 | Clampitt et al. | 166/307 |
| 3,908,760 | 9/1975 | Clampitt et al. | 166/308 X |
| 4,021,355 | 5/1977 | Holtmyer et al. | 252/8.55 |

*Primary Examiner*—Herbert B. Guynn

[57] ABSTRACT

Gelled acidic compositions suitable for either matrix-acidizing or fracture-acidizing of subterranean formations, and methods of using said compositions in acidizing operations, are provided. Said compositions comprise water, a water-dispersible biopolysaccharide, an acid, a water-soluble compound of a polyvalent metal wherein the metal can be reduced to a lower polyvalent valence state and cause gelation of the water containing said biopolysaccharide and said acid, and a reducing agent capable of reducing said metal and causing said gelation.

10 Claims, No Drawings

COMPOSITION FOR ACIDIZING SUBTERRANEAN FORMATIONS

This is a divisional application of application Ser. No. 643,986 filed Dec. 24, 1975, now U.S. Pat. No. 4,068,714.

This invention relates to acid treating or acidizing of subterranean formations.

Acid treating or acidizing of porous subterranean formations penetrated by a well bore has been widely employed for increasing the production of fluids, e.g., crude oil, natural gas, etc., from said formations. The usual technique of acidizing a formation comprises introducing a non-oxidizing acid into the well under sufficient pressure to force the acid out into the formation where it reacts with the acid-soluble components of the formation. The technique is not limited to formations of high acid solubility such as limestone, dolomite, etc. The technique is also applicable to other types of formations such as a sandstone containing streaks or striations of acid-soluble components such as the various carbonates.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix-acidizing.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

Thus, it is within the scope of the present invention to inject the gelled acidic compositions of the invention into the formation under insufficient pressure to cause fracturing of the formation and carry out a matrix acidizing operation, or inject said gelled acidic composition at sufficient rates and pressure to cause fracturing and carry out a combination fracture-acidizing operation.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent and surrounding the well bore. The severity of the problem increases as the well temperature increases because acid reactivity with the formation increases with increasing temperatures, as in deeper wells.

Poor penetration can also be caused, and/or aggravated, by fluid loss to the more porous zones of the formation where low permeability is not a problem. Poor penetration can also be caused, and/or aggravated, by leak-off at the fracture faces in combination fracturing-acidizing operations. Either said fluid loss or said leak-off can frequently worsen the situation by leaving the tight (low permeability) zones of the formation unchanged and merely opening up the already high permeability zones.

One solution which has been proposed for the above discussed problem is to incorporate various polymeric thickening or viscosifying agents into the acid solution. Said agents serve to thicken the acid solution and thus increase the viscosity thereof. It has been reported that so thickened acid solutions have reduced fluid loss properties. For example, see U.S. Pat. No. 3,415,319 issued in the name of B. L. Gibson; and U.S. Pat. No. 3,434,971 issued in the name of B. L. Atkins. It has also been reported that the reaction rate of said so-thickened acid solutions with the acid-soluble portions of the formation is lessened or retarded. See, for example, U.S. Pat. No. 3,749,169 issued in the name of J. F. Tate; U.S. Pat. No. 3,236,305 issued in the name of C. F. Parks; and U.S. Pat. No. 3,252,904 issued in the name of N. F. Carpenter.

Higher viscosities are also advantageous in combination fracturing-acidizing operations in that the more viscous acidic solutions produce wider and longer fractures. More viscous acid solutions are also more effective in carrying propping agents into the formation when propping agents are used.

Another problem encountered in acidizing operations, particularly when employing acidizing compositions having thickening or viscosifying agents incorporated therein, is stability to heat. By stability to heat, it is meant the retention of the increased or greater viscosity properties under the conditions of use. Such compositions to be satisfactory should be sufficiently stable to resist degeneration by the heat of the formation for a period of time sufficient to accomplish the intended purpose, e.g., good penetration and significant etching of the formation. The degree of stability required in any particular operation will vary with such operating variables as the type of formation being treated, the temperature of the formation, the well depth (time to pump the acidic composition down the well and into the formation), the acid concentration in the composition, etc. For example, acidizing of a tight low permeability formation will proceed more slowly than a more permeable formation, other factors being the same, because a longer time will be required to obtain a significant amount of etching and the composition must remain in place and effective for a longer period of time. Also, more time will be required to pump the acidic composition into place in the formation.

The temperature of the formation usually has a pronounced effect on the stability of the acidizing compositions and, generally speaking, is one of the most important operating variables when considering stability. Increased formation temperatures usually have at least two undesirable effects. One such effect is degeneration of the composition, e.g., decrease in viscosity. Another such effect is increased rate of reaction of the acid with the formation. Thus, some compositions which would be satisfactory in a low temperature formation such as in the Hugoton field in the Anadarko basin might not be satisfactory in formations encountered in deeper wells as in some West Texas fields.

In ordinary acidizing operations using unthickened acids there is usually no problem in removing the spent acid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation, or in the fracture. This can inhibit the production of fluids from the formation and can require costly cleanup operations. It would be desirable to have gelled acidic compositions which break down to a lesser viscosity within a short time after the operation is completed.

The present invention provides a solution for, or at least mitigates, the above discussed problems. The present invention provides improved methods for acidizing, or fracture-acidizing, subterranean formations; and new gelled acidic compositions for use in said methods.

Thus, in accordance with one broad aspect of the concept of the invention, there is provided a method for acid treating a porous subterranean formation susceptible of attack by an acid and penetrated by a well bore, which method comprises injecting into said formation via said well bore a gelled acidic composition comprising water; a water thickening amount of a water-dispersible biopolysaccharide produced by the action of bacteria of the genus Xanthomonas on a carbohydrate; an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state; an amount of a water-soluble reducing agent which is effective to reduce at least a portion of said metal to said lower valence state and cause said gelation; an amount of an organic acid which is capable of reacting with a significant amount of the acid-soluble components of said formation; said biopolysaccharide, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation; and maintaining said composition in said formation in contact therewith for a period of time sufficient for the acid in said composition to significantly react with the acid-soluble components of said formation and stimulate the production of fluids therefrom.

Further, in accordance with another broad aspect of the concept of the invention there is provided a gelled acidic composition, suitable for matrix acidizing or fracture-acidizing of a subterranean formation, comprising: water; a water-thickening amount of a water-dispersible biopolysaccharide produced by the action of bacteria of the genus Xanthomonas on a carbohydrate; an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state; an amount of a water-soluble reducing agent which is effective to reduce at least a portion of said metal to said lower valence state and cause said gelation; and an amount of an organic acid which is capable of reacting with a significant amount of the acid-soluble components of said formation; said biopolysaccharide, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to significantly react with the acid-soluble components of said formation and stimulate the production of fluids therefrom.

Still further, in accordance with other broad aspects of the invention, there are provided methods for preparing said gelled acidic compositions.

As noted above, the gelled acidic compositions of the invention must be suitable for matrix acidizing or fracture-acidizing of subterranean formations. In order to satisfy this requirement, the biopolysaccharide, the polyvalent metal compound, the reducing agent, and the acid, in the amounts used, must be sufficiently compatible with each other, in an aqueous dispersion thereof, to permit the gelation of said dispersion and thus form a said composition having sufficient stability to degeneration by the heat of the formation to permit good penetration of said composition into the formation. Furthermore, once said penetration has been attained, the said stability must be sufficient to permit the maintaining of said composition in contact with the formation for a period of time sufficient for the acid in the composition to significantly react with the acid-soluble components of the formation and stimulate the production of fluids therefrom, e.g., by creating new passageways or enlarging existing passageways through said formation.

Herein and in the claims, unless otherwise specified, the term "good penetration" means penetration of live or effective acid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given acidizing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of a few feet, e.g., up to 5 or more, in a small volume matrix acidizing operation, and several hundred feet, e.g., up to 500 or more, in a large volume fracture-acidizing operation.

Herein and in the claims, unless otherwise specified, the term "water-dispersible biopolysaccharide" is employed generically to include those biopolysaccharides which are truly water-soluble and those which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled as described herein.

Any suitable biopolysaccharide meeting the above stated compatibility requirements can be used in the practice of the invention. Thus, under the proper conditions of use, such biopolysaccharides can include those produced by the action of bacteria of the genus Xanthomonas on carbohydrates, and which can be used in an aqueous medium with the gelling agents described herein to give an aqueous gel. These materials are biochemically synthesized polysaccharides and are referred to as biopolysaccharides to distinguish them from naturally occurring polysaccharides. Representative species of said Xanthomonas bacteria include Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedazae, Xanthomonas malvacearum, Xanthomonas holcicola, Xanthomonas papavericola, Xanthomonas phaseoli, Xanthomonas pisi, Xanthomonas translucens, Xanthomonas vasculorum and Xanthomonas vesicatoria. It has been shown in the prior art that the production of such biopolysaccharides is a characteristic trait of members of the Xanthomonas genus. It has also been reported that certain species produce the polymers with particular efficiency and are thus preferred. These preferred species include Xanthomonas begoniae, Xanthomonas campestris, Xanthomonas incanae, and Xanthomonas pisi.

According to the prior art, a wide variety of carbohydrates can be fermented with bacteria of the genus Xanthomonas to produce said biopolysaccharides. Suitable carbohydrates include sucrose, glucose, maltose, fructose, lactose, galactose, soluble starch, corn starch, potato starch, and the like. The prior art has also shown that the carbohydrates need not be in a highly refined state and that crude materials from natural sources can be utilized. Examples of suitable such natural source materials include crude molasses, raw sugar, raw potato starch, sugar beet juice, and the like. Since they are much less expensive than the corresponding refined carbohydrates, such natural source materials are usually preferred for use as the substrate in preparing said biopolysaccharides.

Fermentation of the carbohydrate to produce said biopolysaccharides can be carried out in an aqueous medium containing from about 1 to 5 percent of the carbohydrate, from about 0.1 to 0.5 weight percent of dipotassium acid phosphate, and from about 0.1 to 10 weight percent of a suitable nutrient containing suitable trace elements and organic nitrogen sources. Commercially available distillers solubles such as "Stimuflav" sold by Hiram Walker and Sons is an example of such a nutrient. Some of the crude carbohydrate sources mentioned above, such as raw sugar beet juice, apparently contain the trace elements and organic nitrogen sources in sufficient quantity to make the addition of a nutrient unnecessary. It has been reported that good results have been obtained with raw sugar beet juice without the addition of a nutrient. The fermentation is usually carried out at a temperature between about 70° and 100° F. for about 1 to about 3 days after sterilizing the medium and inoculating it with bacteria of the genus Xanthomonas. Further details regarding the preparation of said biopolysaccharides can be found in U.S. Pat. Nos. 3,020,206, issued Feb. 6, 1962; 3,243,000 issued Mar. 29, 1966; and 3,163,602 issued Dec. 29, 1964. Polysaccharide B-1459 is an example of a biopolysaccharide produced by the action of Xanthomonas campestris bacteria, and which is commercially available in various grades under the trademark "Kelzan" from the Kelco Company, Los Angeles, Cal.

All the biopolysaccharides useful in the practice of the invention are characterized by high molecular weight. The molecular weight is not critical so long as the biopolysaccharide has the above-described water-dispersible properties. It is preferred that the biopolysaccharide have a molecular weight of at least 500,000, more preferably at least about 2,000,000. The upper limit of molecular weight is unimportant so long as the biopolysaccharide is water-dispersible, and the gelled acidic composition prepared therefrom can be pumped. Thus, it is within the scope of the invention to use biopolysaccharides having molecular weights as high as 20,000,000 or higher, and meeting said conditions.

The amount of the above-described biopolysaccharides used in preparing the gelled acidic compositions of the invention can vary widely depending upon the particular biopolysaccharide used, the purity of said biopolysaccharide, and the properties desired in said compositions. In general, the amount of biopolysaccharide used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Water containing 25 ppm of Kelzan MF, a biopolysaccharide produced by the action of Xanthomonas campestris on a carbohydrate, had a viscosity increase of about 20 percent when measured on a Model LVT-UL Brookfield viscometer at 6 rpm. At 50 ppm the viscosity increase was about 265 percent. At 100 ppm the viscosity increase was about 530 percent. Generally speaking, amounts of the above-described biopolysaccharides in the range of from 0.01 to 5, preferably from 0.1 to 2, more preferably 0.1 to 1.5, weight percent, based on the total weight of the composition, can be used in preparing gelled acidic compositions for use in the practice of the invention. However, amounts outside said ranges can be used. In general, with the proper amounts of polyvalent metal and reducing agent, the amount of biopolysaccharide used will determine the consistency of the gel obtained. Generally speaking, small amounts will usually produce liquid mobile gels which can be readily pumped. Large amounts of biopolysaccharide will usually produce thicker, more viscous, gels. Gels having a viscosity "too thick to measure" by conventional methods can still be used in the practice of the invention. Thus, there is really no fixed upper limit on the amount of biopolysaccharide which can be used so long as the gelled acidic composition can be pumped in accordance with the methods of the invention.

Metal compounds which can be used in the practice of the invention are water-soluble compounds of polyvalent metals wherein the metal is present in a valence state which is capable of being reduced to a lower polyvalent valence state, and which will meet the above-stated compatibility requirements. Thus, under proper conditions of use, examples of such compounds can include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used will be a small but finite amount which is effective or sufficient to cause gelation of an aqueous dispersion of the starting components of the compositions of the invention when the metal in the polyvalent metal compound is reduced to a lower polyvalent valence state. The lower limit of the concentration of the starting metal-containing compound will depend upon several factors including the particular type of biopolysaccharide used, the concentration of the biopolysaccharide, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gelled compositions. It is believed this can provide one valuable method for controlling stability or life span so as to obtain gelled acidic compositions which will break down with time and/or temperature to permit ready well clean-up subsequent to an acidizing fracturing-acidizing operation. As a general guide, the amount of the starting polyvalent metal-containing compound used in preparing the gelled acidic compositions of the invention will be in the range of from 0.05 to 30, preferably 0.5 to 20, weight percent of the amount of the biopolysaccharide used. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by suitable experiments carried out in the light of this disclosure.

Suitable water-soluble reducing agents which can be used in the practice of the invention are those meeting the above-stated compatibility requirements. Under proper conditions of use this can include sulfur-containing compounds such as sodium sulfite, potassium sulfite, sodium hydrosulfite, potassium hydrosulfite, sodium metabisulfite, potassium metabisulfite, sodium bisulfite, potassium bisulfite, sodium sulfide, potassium sulfide, sodium thiosulfate, potassium thiosulfate, ferrous sulfate, thioacetamide, hydrogen sulfide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others.

One presently preferred group of reducing agents are the water-soluble organic compounds containing from 1 to about 10 carbon atoms per molecule and which release hydrogen sulfide upon hydrolysis. These compounds contain the group $=C=S$ and include organic amides, xanthate salts, trithiocarbonate salts, and dithiocarbamate salts. Some examples are: thioacetamide, thiourea, thioformamide, thiopropionamide, sodium ethyl xanthate, N,N-diethyl sodium dithiocarbamate, sodium butyltrithiocarbonate, and the like. Mixtures of said reducing agents can also be used.

The amount of reducing agent to be used in preparing the gelled acidic compositions of the invention will be a small but finite amount which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent metal compound to said lower polyvalent valence state, e.g., +6 Cr to +3 Cr. In most instances it will be preferred to use at least a stoichiometric amount. However, in some instances, it may be desirable to use amounts of reducing agent outside said ranges. The use of such amounts is within the scope of the invention. Those skilled in the art can determine the amount of reducing agent to be used by suitable simple experiments carried out in the light of this disclosure.

Acids useful in the practice of the invention include any organic acid meeting the above-stated compatibility requirements and which is effective in increasing the flow of fluids, e.g., hydrocarbons, through the formation and into the well. Thus, under proper conditions of use, examples of such acids can include the $C_1-C_3$ organic acids such as formic acid, acetic acid, propionic acid, and mixtures thereof. The concentration or strength of the acid can vary depending upon the type of acid, the type of formation being treated, the above-stated compatibility requirements, and the results desired in the particular treating operation. The concentration can vary from 1 to about 60 weight percent, with concentrations within the range of 5 to 50 weight percent usually preferred, based upon the total weight of the gelled acidic composition. Acid concentrations within the range of from 10 to 40 weight percent are sometimes more preferred. The acids used in the practice of the invention can contain any of the known corrosion inhibitors, deemulsifying agents, sequestering agents, surfactants, friction reducers, etc., known in the art, and which meet the above-stated compatibility requirements.

The gelled acidic compositions of the invention are aqueous compositions. They normally contain a significant amount of water. The amount of said water can vary widely depending upon the concentrations of the other components in the compositions, particularly the concentration of the acid. For example, when an organic acid such as acetic acid is used in the maximum concentration of 60 weight percent, the amount of water present in the composition clearly will be less than when a lower concentration of acid is used. Thus, while no precise overall range of water content can be set forth, based on the above-stated overall ranges for the concentrations of said other components the water content of said compositions can be in the range of from about 5 to about 99, frequently about 10 to about 90, weight percent. However, amounts of water outside said ranges can be used.

Propping agents can be included in the gelled acidic compositions of the invention if desired. Propping agents which can be used include any of those known in the art, e.g., sand grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed. When propping agents are used they should be made of materials which are not severely attacked by the acid used during the time they are exposed to said acid.

Any suitable method can be employed for preparing the gelled acidic compositions of the invention. Thus, any suitable mixing technique or order of addition of the components of said composition to each other can be employed which will provide a said composition having sufficient stability to degeneration by the heat of the formation (in which the composition is to be used) to permit good penetration of the composition into, and significant etching of, said formation. However, it is ordinarily preferred to first dissolve or disperse the biopolysaccharide in water before contacting the biopolysaccharide with acid. Thus, it is preferred to avoid contacting the dry biopolysaccharide with aqueous acid. Some suitable mixing orders, with the components named in order of mixing, include: water—biopolysaccharide—polyvalent metal compound—reducing agent—acid; water—biopolysaccharide—acid—polyvalent metal compound—reducing agent; and water—biopolysaccharide—polyvalent metal compound—acid—reducing agent; and the like. It is within the scope of the invention to moisten or slurry the polymer in a small amount, e.g., about 1 to about 6 weight percent based on the weight of the polymer, of a low molecular weight alcohol, e.g., $C_1$ to $C_3$ alcohols, as a dispersion aid prior to dispersing the polymer in water. Contact of the polyvalent metal compound and reducing agent in the absence of the dispersed biopolysaccharide should be avoided. Since the acid may sometimes have a degrading effect on the polymer, it is preferred that the acid not be in contact with the biopolysaccharide, even in aqueous solution, unduly long in the absence of the gelling agents. Similarly, it is preferred that there be no undue delay between completing the preparation of the gelled acidic composition and its introduction into contact with the formation.

The gelled acidic compositions of the invention can be prepared on the surface in a suitable tank equipped with suitable mixing means, and then pumped down the well and into the formation employing conventional equipment for pumping acidic compositions. However, it is within the scope of the invention to prepare said compositions while they are being pumped down the well. This technique is sometimes referred to as "on the fly". For example, a solution of the biopolysaccharide in water can be prepared in a tank adjacent the well head. Pumping of this solution through a conduit to the well head can then be started. Then, a few feet downstream from the tank a suitable connection can be provided for introducing the polyvalent metal compound into said conduit, either dry through a mixing hopper, or preferably as an aqueous solution. Then, a few feet farther downstream the reducing agent can be similarly introduced, preferably as an aqueous solution. The acid can then be introduced into said conduit a few feet downstream from the reducing agent. As will be understood by those skilled in the art, the rate of introduction of said components into said conduit will depend upon the pumping rate of the biopolysaccharide solution through said conduit. Any of the above-mentioned orders of addition can be employed in said "on the fly" technique. Mixing orifices can be provided in said conduit, if desired.

It is within the scope of the invention to precede the injection of the gelled acidic composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease in the order of 100° to 250° F.

The following examples will serve to further illustrate the invention, but should not be considered as unduly limiting on the invention.

EXAMPLE I

A series of runs was carried out in which a soluble biopolysaccharide (Kelzan MF) having a molecular weight of about 10 million was used in the gelation of an approximately 50 weight percent acetic acid solution. The effects of different mixing orders for the components of the compositions were investigated.

In Method A the biopolysaccharide was dispersed in the aqueous acid and then blended with an appropriate amount of $Na_2Cr_2O_7\cdot 2H_2O$ followed by an appropriate amount of $NaHSO_3$.

In Method B the biopolysaccharide was dissolved in water, then the appropriate amount of 99.7 weight percent acetic acid was added. Immediately afterwards, the appropriate amount of sodium dichromate was dissolved into the solution, followed by the sodium bisulfite component.

In Method C, the polymer was dissolved in the water by means of a high speed, high-shear mixer (Hamilton Beach Malt Mixer). In rapid succession, the sodium dichromate was added, the appropriate amount of 99.7 weight percent acetic acid was added, and the sodium bisulfite was added. The total mixing time was 2 minutes.

Each of the compositions prepared by the above-described methods was visually examined for the appearance of gelation and then further examined, when appropriate, for viscosity level, after standing one hour at room temperature, using a Fann Model 35 V-G Meter which had been modified to resist acid corrosion.

For purposes of comparison, several additional runs were carried out which were essentially the same as those described above except that the dichromate and bisulfite components were omitted. These runs as well as the invention runs are shown in Table I below.

Table I

| | | | | | Gelled Acidic Compositions Using Soluble Biopolysaccharide (BPS) | | | | | | | |
|---|---|---|---|---|---|---|---|---|---|---|---|---|
| | | | | | Gelling Agents | | Fann Apparent Viscosity after 1 hr. at R.T., cp | | | | | |
| Run No. | Mixing Method | BPS g | Water ml | Acid ml | DiCr ppm | NaHSO$_3$ ppm | 5 sec$^{-1}$ | 10 sec$^{-1}$ | 170 sec$^{-1}$ | 340 sec$^{-1}$ | 510 sec$^{-1}$ | 1020 sec$^{-1}$ |
| 1 | b | 7.5 | 250 | 250$^a$ | 0 | 0 | 2600 | 1600 | 174 | 94 | 76 | 47 |
| 2 | c | 3.75 | 250 | 250$^a$ | 0 | 0 | 5200 | 2900 | 255 | 147 | 109 | 67 |

Table I-continued

Gelled Acidic Compositions Using Soluble Biopolysaccharide (BPS)

| Run No. | Mixing Method | BPS g | Water ml | Acid ml | Gelling Agents DiCr ppm | NaHSO$_3$ ppm | Fann Apparent Viscosity after 1 hr. at R.T., cp | | | | | |
|---|---|---|---|---|---|---|---|---|---|---|---|---|
| | | | | | | | 5 sec$^{-1}$ | 10 sec$^{-1}$ | 170 sec$^{-1}$ | 340 sec$^{-1}$ | 510 sec$^{-1}$ | 1020 sec$^{-1}$ |
| 3 | d | 7.5 | 250 | 250$^a$ | 0 | 0 | 3100 | 1800 | 216 | 157 | 140 | 89 |
| 4 | A | 7.5 | 250 | 250$^a$ | 1250 | 4000 | 2500 | 1500 | 165 | 101 | 72 | 45 |
| 5 | B | 3.75 | 250 | 250$^a$ | 1250 | 4000 | TTTM$^e$ | — | — | — | — | — |
| 6 | C | 7.5 | 250 | 250$^a$ | 1250 | 4000 | TTTM$^e$ | — | — | — | — | — |

$^a$99.7 weight percent acetic acid. Final acid concentration was about 50 weight percent.
$^b$No gelling agents used. Polymer was dispersed in about 50 weight percent acetic acid.
$^c$No gelling agents used. Polymer was dissolved in water, then acid was added.
$^d$No gelling agents used. Polymer was mixed with water in high speed mixer, then acid added.
$^e$Too thick to measure. Gelled composition was semi-solid.

Based on the data in Table I it is concluded that 50 percent acetic acid solutions can be gelled using biopolysaccharides together with a polyvalent metal compound wherein the metal present is capable of being reduced to a lower polyvalent valence state and a reducing agent, e.g., the dichromate-bisulfite gelling or crosslinking agents (see run 5 versus 2, and run 6 versus 3). It is also concluded that the preferred mixing order is to first dissolve the biopolysaccharide in water. (See run 4 versus runs 5 and 6). It is also concluded that although the viscosities of the gelled compositions of runs 5 and 6 were too high to be measured by the Fann viscometer, the compositions are considered to have suitable viscosity for fracturing operations.

EXAMPLE II

In another series of runs, the soluble biopolysaccharide (Kelzan MF) was again used to form gelled acidic compositions and the resulting compositions were subjected to still different tests.

In each of these runs, the composition was prepared using 15,000 ppm biopolysaccharide, 1250 ppm Na$_2$CrO$_7$·2H$_2$O, 1500 ppm of either sodium bisulfite or thioacetamide, and 50 weight percent acetic acid. The compositions were prepared by: dispersing the required amount of polymer in tap water and aging overnight; transferring measured aliquots of the prehydrated polymer into pint jars; adding the dichromate and stirring; adding the reducing agent and stirring; and adding the required amount of glacial acetic acid within one minute of the addition of reducing agent to give 50 weight percent acetic acid and stirring.

The resulting compositions were too thick to pour into a capillary viscometer for viscosity measurements, even when heated to 200° F. in a water bath.

For purposes of comparison, a sample composition was similarly prepared with the biopolysaccharide and acid present but with the dichromate and reducing agent omitted. This composition was also too thick to pour into a capillary viscometer for viscosity measurements, even when heated to 200° F. in a water bath.

Since the gelled acidic compositions prepared with dichromate and a reducing agent, and also the comparison composition prepared without dichromate and a reducing agent, were all too thick for viscosity measurements in a capillary viscometer, all the compositions were further tested for stability characteristics.

Duplicate compositions were prepared as before. About 110 ml of each composition was placed in a 200 ml glass pressure bottle. The bottle containing the sample was heated to about 180° F. in a water bath, then sealed and placed in an oil bath maintained at 250° F. The samples were then observed visually at 5 minute intervals for evidence of breakdown, e.g., thinning, as shown by inability to support air bubbles when the bottles were swirled.

The results of the tests are set forth in Table II below.

Table II

| Run No. | Reducing Agent | Acid | Mixing Rating | Appearance | Break time, minutes in oil bath at 250° F. |
|---|---|---|---|---|---|
| 1 | None | HAc | Easy | Homogeneous$^b$ | 20 |
| 2 | Thioacetamide$^a$ | HAc | Easy | Homogeneous$^b$ | 40 |
| 3 | Bisulfite | HAc | Easy | Homogeneous$^b$ | 25 |

$^a$Also contained sodium dichromate.
$^b$Too thick for viscometer even up to 200° F.

Based on the data in the above Table II it is concluded that the gelled acidic compositions of Runs 2 and 3 are more stable to temperature than the composition of Run 1.

Based on the data in the above Tables I and II, it is concluded that the gelled acidic composition comprising an aqueous solution of a biopolysaccharide and having incorporated therein sodium dichromate dihydrate, thioacetamide or sodium bisulfite reducing agent, and acetic acid are presently preferred compositions in accordance with the invention. From the above viscosity data it is concluded that because of their greater viscosity the gelled compositions of the invention would be superior to the comparison compositions wherein no gelling agents were used, particularly in fracture-acidizing operations. From the above data, it is further concluded that the components of the gelled composition have sufficient compatibility with each other to permit good penetration (as defined above) into the formation, and permit maintaining of the composition in contact with the formation for a period of time usually sufficient for the acid to significantly react with the acid-soluble components of the formation. Thus, it is further concluded that suitable compositions in accordance with the invention could be used advantageously for acidizing operations in wells having a depth of up to at least 10,000 feet, and at formation temperatures of up to at least 200° F. The use of a preflush cooling fluid injected down the well and into the formation prior to the injection of the gelled acidic compositions would extend said ranges of operation. As will be understood by those skilled in the art, the actual attainable ranges of effective acidizing operation will depend upon the viscosity of the gelled composition, the formation temperature, the composition of the formation, the rate of injection of the gelled acidic composition, the acid concentration in said gelled acidic composition, etc.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A gelled acidic composition, suitable for matrix-acidizing or fracture-acidizing of a subterranean formation, comprising:
water;
a water-thickening amount of a water-dispersible biopolysaccharide produced by the action of bacteria of the genus Xanthomonas on a carbohydrate;
an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state, said compound being selected from the group consisting of potassium permanganate, sodium permanganate, ammonium chromate, ammonium dichromate, the alkali metal chromates, the alkali metal dichromates, and chromium trioxide;
an amount of a water-soluble reducing agent which is effective to reduce at least a portion of said metal to said lower valence state and cause said gelation; and
an amount of an organic acid which is capable of reacting with a significant amount of the acid-soluble components of said formation;
said biopolysaccharide, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to significantly react with the acid-soluble components of said formation and stimulate the production of hydrocarbons therefrom.

2. A composition according to claim 1 wherein:
the amount of said biopolysaccharide is within the range of from 0.01 to about 5 weight percent based upon the total weight of said composition;
the amount of said polyvalent metal compound is within the range of from 0.05 to 30 weight percent based upon the weight of said biopolysaccharide;
the amount of said reducing agent is within the range of from 0.1 to about 200 percent of the stoichiometric amount required to reduce said polyvalent metal to said lower valence state; and
the amount of said acid is within the range of from 1 to 60 weight percent, based on the total weight of said composition.

3. A composition according to claim 1 wherein said biopolysaccharide is one produced by Xanthomonas campestris.

4. A composition according to claim 1 wherein said acid is selected from the group consisting of formic acid, acetic acid, propionic acid, and mixtures thereof.

5. A composition according to claim 2 wherein:
said biopolysaccharide is one produced by Xanthomonas campestris; and
said acid is selected from the group consisting of formic acid, acetic acid, propionic acid, and mixtures thereof.

6. A composition according to claim 5 wherein:
the amount of said biopolysaccharide is within the range of from about 0.1 to about 2 weight percent;
said polyvalent metal compound is sodium dichromate or potassium dichromate;
said acid is acetic acid and the amount thereof is within the range of from about 5 to about 50 weight percent; and
said reducing agent is selected from the group consisting of sodium or potassium bisulfite, and thioacetamide.

7. A method for preparing a gelled acidic composition, suitable for matrix-acidizing or fracture-acidizing of a subterranean formation, which method comprises:
dispersing in water a water-thickening amount of a water-dispersible biopolysaccharide produced by the action of bacteria of the genus Xanthomonas on a carbohydrate;
adding to said water containing said biopolysaccharide an amount of an organic acid which is capable of reacting with a significant amount of the acid-soluble components of said formation;
then adding to said water an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state, said compound being selected from the group consisting of potassium permanganate, sodium permanganate, ammonium chromate, ammonium dichromate, the alkali metal chromates, the alkali metal dichromates, and chromium trioxide; and
then adding to said water an amount of a water-soluble reducing agent which is effective to reduce at least a portion of said metal to said lower valence state and cause gelation;
said biopolysaccharide, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to significantly react with the acid-soluble components of said formation and stimulate the production of hydrocarbons therefrom.

8. A method according to claim 7 wherein:
the amount of said biopolysaccharide is within the range of from 0.01 to about 5 weight percent based upon the total weight of said composition;
the amount of said polyvalent metal compound is within the range of from 0.05 to 30 weight percent based upon the weight of said biopolysaccharide;
the amount of said reducing agent is within the range of from 0.1 to about 200 percent of the stoichiometric amount required to reduce said polyvalent metal to said lower valence state; and the amount of said acid is within the range of from 1 to 60 weight percent, based on the total weight of said composition.

9. A method according to claim 8 wherein:
said biopolysaccharide is one produced by Xanthomonas campestris; and
said acid is selected from the group consisting of formic acid, acetic acid, propionic acid, and mixtures thereof.

10. A method according to claim 9 wherein:

the amount of said biopolysaccharide is within the range of from about 0.1 to about 2 weight percent;
said polyvalent metal compound is sodium dichromate or potassium dichromate;
said acid is acetic acid and the amount thereof is within the range of from about 5 to about 50 weight percent; and
said reducing agent is selected from the group consisting of sodium or potassium bisulfite, and thioacetamide.

* * * * *